(12) United States Patent
Ebina

(10) Patent No.: US 6,188,901 B1
(45) Date of Patent: Feb. 13, 2001

(54) CALL DESTINATION NUMBER CONVERSION SYSTEM FOR REPRESENTATIVE PHONE NUMBER CONNECTION SERVICES

(75) Inventor: Masaru Ebina, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/129,704

(22) Filed: Aug. 5, 1998

(30) Foreign Application Priority Data

Feb. 10, 1998 (JP) .................................................. 10-028849

(51) Int. Cl.[7] ...................................................... H04Q 7/20
(52) U.S. Cl. ............................................ 455/445; 455/458
(58) Field of Search .................................... 455/445, 551, 455/578, 519, 520, 455, 422, 433, 434, 435, 458

(56) References Cited

U.S. PATENT DOCUMENTS

| | | | | |
|---|---|---|---|---|
| 5,625,886 | * | 4/1997 | Raes | 455/54.1 |
| 5,835,860 | * | 11/1998 | Diachina | 455/458 |
| 5,953,673 | * | 9/1999 | Neubauer | 455/518 |
| 5,960,360 | * | 9/1999 | Carmon | 455/518 |
| 5,970,417 | * | 10/1999 | Toyryla | 455/519 |

FOREIGN PATENT DOCUMENTS

| | | |
|---|---|---|
| 800 320 | 10/1997 | (EP) . |
| 2309617 | 7/1997 | (GB) . |
| 9009354 | 1/1997 | (JP) . |

\* cited by examiner

*Primary Examiner*—Daniel S. Hunter
*Assistant Examiner*—Nick Corsaro
(74) *Attorney, Agent, or Firm*—Helfgott & Karas, P.C.

(57) ABSTRACT

A call destination number conversion system to provide representative phone number connection services in a mobile communications system. A notification unit in a base station notifies mobile stations of representative phone numbers and individual phone numbers of subscriber terminals. Upon receipt of this information, a storage unit disposed in each mobile station stores the representative phone numbers and their associated individual phone numbers. When a mobile user has dialed a representative phone number to initiate a call from his/her mobile station, a reading unit in the mobile station searches the storage unit to read out a specific individual phone number associated with the dialed representative phone number. Finally, a call request unit sends a call setup request to the base station, specifying the individual phone number read out by the reading unit as the call destination number.

8 Claims, 11 Drawing Sheets

FIG. 7(A)

| CATEGORY NUMBER |
|---|

FIG. 7(B)

| REPRESENTATIVE PHONE NUMBER |
|---|
| INDIVIDUAL PHONE NUMBER |
| ⋮ |
| REPRESENTATIVE PHONE NUMBER |
| INDIVIDUAL PHONE NUMBER |

CALL DESTINATION NUMBER CONVERSION SYSTEM FOR REPRESENTATIVE PHONE NUMBER CONNECTION SERVICES

BACKGROUND OF THE INVENTION

1. Field of the Invention

The present invention relates to a call destination number conversion system, and more particularly to a call destination number conversion system which offers representative phone number connection services in mobile radio communications, including cellular and cordless systems.

2. Description of the Related Art

In a mobile communications system, representative phone number connection services permit a caller to reach a member of a specific subscriber group by simply dialing the group's representative number, without the need for knowing the member's individual phone number. To make this service feature available, a representative number is previously assigned to a plurality of subscriber terminals, in addition to their own individual phone numbers in such a way that the representative number will be unique within a predivided geographical zone. When a mobile user has dialed such a representative phone number to initiate a call from a certain predivided zone, the system automatically identifies and calls up a subscriber terminal that resides in the same zone and is associated with the representative phone number that he/she dialed.

Suppose, for instance, that a certain company has a plurality of branch offices at many places in the country. More specifically, think of convenience stores operating under a franchise arrangement, or auto shops and body shops affiliated with a particular automobile manufacturer, and assume that there is a user of a mobile station who wishes to make a contact with someone in such a shop or branch office. In an attempt to call the nearest shop or office, he/she now dials a representative number of the company, without knowing the actual phone numbers of that particular shop or office. The representative phone number connection service then connects him/her to the desired place.

In such a service, a single common representative number has to be preassigned to the subscriber terminals at the branch offices, while each terminal has its own phone number. The relationships between this representative phone number and corresponding individual phone numbers are managed in a database, separately for each different geographical region. When a mobile station initiates a call by using the representative phone number, it is transferred to a mobile services switching center (MSC) via a base station. The MSC then makes access to the above database to retrieve the phone number of a subscriber terminal that is relevant to the representative phone number and location data received from the mobile station. Now that the individual phone number is obtained, the MSC sets up a connection between the mobile station and the subscriber terminal. As such, the knowledge of a common, nation-wide representative phone number permits the mobile user to call up the nearest branch office of the company, wherever he/she may be in the country.

The aforementioned database, however, tends to increase in volume, because it generally has to serve for a wide coverage area, and this results in higher equipment costs. Although this problem could be avoided by limiting the size of the database, it would impose more stringent restriction on the allowable number of subscriber terminals per representative number. In other words, it would be difficult to divide the coverage area into smaller segments to allow more subscriber terminals to share a common representative phone number. This spoils flexibility of the service.

Further, in conventional systems, the MSC has to examine each phone number received from mobile stations as to whether it is a representative phone number, and if so, the MSC has to generate a query to the database to retrieve a relevant destination phone number to which the call should be connected. This leads to a concern that such processing burden could cause degradation in the throughput and/or reliability of mobile communications systems.

SUMMARY OF THE INVENTION

Taking the above into consideration, an object of the present invention is to provide a call destination number conversion system which enables reduction in equipment costs, throughput enhancement in a mobile communications system, and improvement in representative phone number connection services.

To accomplish the above object, according to the present invention, there is provided a call destination number conversion system for use in a mobile communications system to provide a representative phone number connection service which permits a user of a mobile station to reach, by simply dialing a representative phone number, a specific subscriber terminal located within a predivided zone where the mobile station stays, the representative phone number being previously assigned to the plurality of subscriber terminals each having an individual phone number, in such a way that the representative phone number will be uniquely associated with one individual phone number within each predivided zone. This call destination number conversion system comprises the following elements:

a notification unit, disposed in a base station, for notifying the mobile station of the representative phone number and the individual phone number of a subscriber terminal that is associated with the representative phone number and is located in the same predivided zone as the base station resides;

a storage unit, disposed in the mobile station, for storing the representative and individual phone numbers notified from the notification unit;

a reading unit, disposed in the mobile station, for searching the storage unit upon receipt of the representative phone number that the mobile user has dialed in an attempt to initiate a call from the mobile station, and reading out the individual phone number that is associated with the representative phone number; and a call request unit, disposed in the mobile station, for sending a call setup request to the base station, specifying as a call destination number the individual phone number read out by the reading unit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7(A) is a diagram showing an area reserved in the RAM of a data processing unit in a mobile station for the purpose of category number storage;

FIG. 7(B) is a diagram showing an area reserved in the RAM of a data processing unit in a mobile station to store representative-individual phone number pairs;

DESCRIPTION OF THE PREFERRED EMBODIMENTS

Four embodiments of the present invention will be described below with reference to the accompanying drawings.

Figure 1:
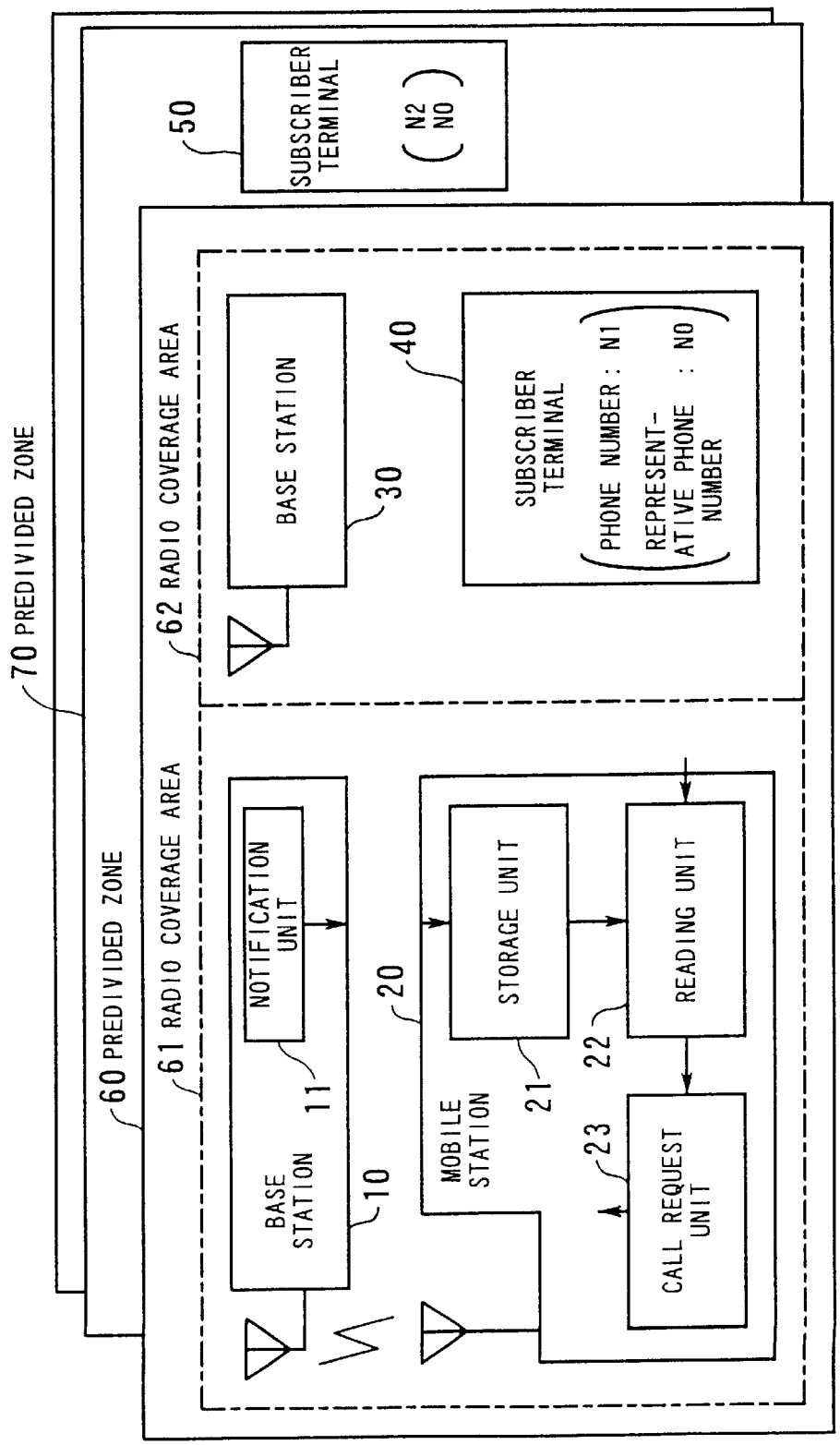
FIG. 1 is a conceptual view of the present invention.

Referring first to FIG. 1, the following will present the concept of a first embodiment of the present invention. In this first embodiment, the system comprises the following elements:

- a notification unit 11, disposed in a base station 10, to notify a mobile station 20 of a representative phone number (N0) and an individual phone number (N1) of a subscriber terminal 40 that is associated with the representative phone number (N0) and is located in the same predivided zone 60 as the base station 10 resides;

- a storage unit 21, disposed in the mobile station 20, to store the representative phone number (N0) and the individual phone number (N1) notified from the notification unit 11;

- a reading unit 22, disposed in the mobile station 20, to search the storage unit 21 when a mobile user has dialed the representative phone number (N0) to initiate a call from the mobile station 20, and to read out the individual phone number (N1) associated with the dialed representative phone number (N0);

- a call request unit 23, disposed in the mobile station 20, to send a call setup request to the base station 10, specifying the individual phone number (N1) read out by the reading unit 22 as the call destination number.

FIG. 1 specifically shows the above arrangement, where the base station 10 communicates with mobile stations (e.g., the mobile station 20) within a radio coverage area 61, while another base station 30 communicates with mobile stations (not shown) within another radio coverage area 62. The radio coverage areas 61 and 62 are contained in the predivided zone 60. The subscriber terminal 40 is located in this predivided zone 60 as a subscriber terminal to be reached through the representative phone number connection service. FIG. 1 shows another predivided zone 70, although its details are omitted. Similar to the predivided zone 60, this zone 70 may also include one or more radio coverage areas, and there exists a subscriber terminal 50 which is another subject of the representative phone number connection service. There may be more predivided zones having like structure, as can be easily understood from FIG. 1. In some cases, the predivided zones are directly mapped onto the radio coverage areas of base stations, or in other cases, each predivided zone may contain two or more such areas. The size of the zones depends on the density of subscriber terminals reachable through the representative phone number connection service. That is, the zones are defined in such a way that each predivided zone will contain a single subscriber terminal (per representative phone number) that is reachable through the representative phone number connection service, and its size can vary according to the growth or decline of the service.

As FIG. 1 shows, the subscriber terminal 40 has its own individual phone number N1, while the subscriber terminal 50 has its own number N2. Besides, the two terminals 40 and 50 share a common representative phone number N0. The notification unit 11 in the base station 10 checks whether any such subscriber terminals exist in the predivided zone 60 where the base station 10 is situated. When such terminals are found, the notification unit 11 first sends their individual and representative phone numbers to mobile stations located within the radio coverage area 61. This notification is conducted when each mobile station is enabled, and also repeated at predetermined intervals. In the present example of FIG. 1, the notification unit 11 sends the subscriber terminal 40's phone number (N1) and its associated representative phone number (N0) to the mobile station 20. Upon receipt of this information, the mobile station 20 makes the storage unit 21 store the representative phone number (N0) and individual phone number (N1) as a new entry.

Suppose now that the user of the mobile station 20 has dialed the representative phone number (N0) to initiate a call. In response to this request, the reading unit 22 in the mobile station 20 searches the storage unit 21 to read out the individual phone number (N1) associated with the dialed representative phone number (N0). The call request unit 23 then sends a call setup request to the base station 10, specifying the individual phone number (N1) read out by the reading unit 22 as the call destination number. This enables the mobile station 20 to be connected to the subscriber terminal 40.

The present invention reduces equipment costs, since it eliminates the conventional database in this way. The present invention also frees the mobile services switching centers from the burden of determining whether each call refers to a representative phone number, as well as from workloads of generating a query to the database as to the destination phone number. This contributes to the improvement of mobile communications systems in terms of the system throughput and reliability. Furthermore, the present invention allows the service coverage area to be divided into smaller segments, in order for more subscriber terminals to share a common representative phone number. This introduces more flexibility in the representative phone number connection services.

Now, the following section will describe the first embodiment of the present invention in more detail.

Figure 2:
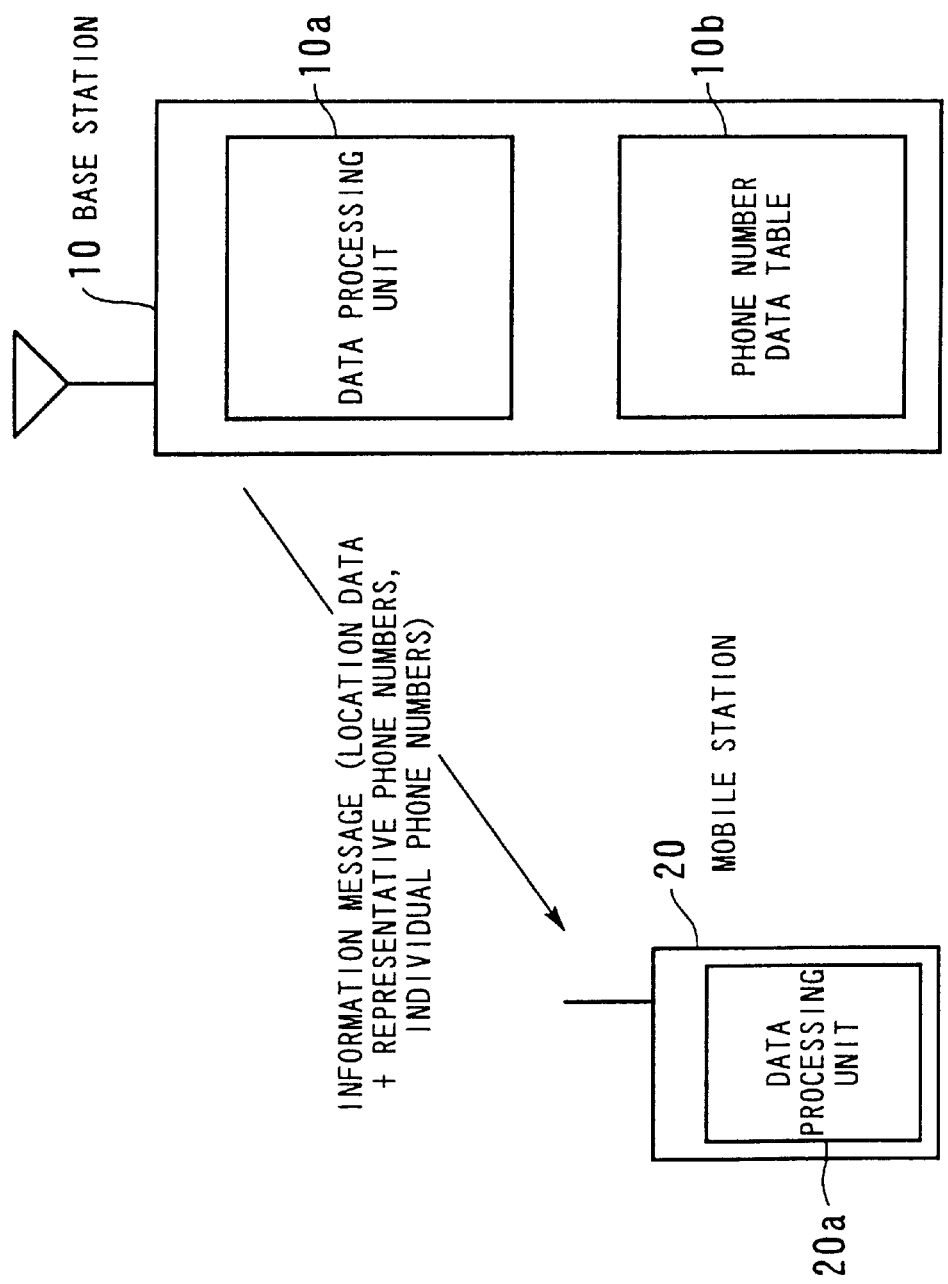
FIG. 2 is a diagram which shows a base station and a mobile station in a first embodiment of the present invention.
Figure 3:
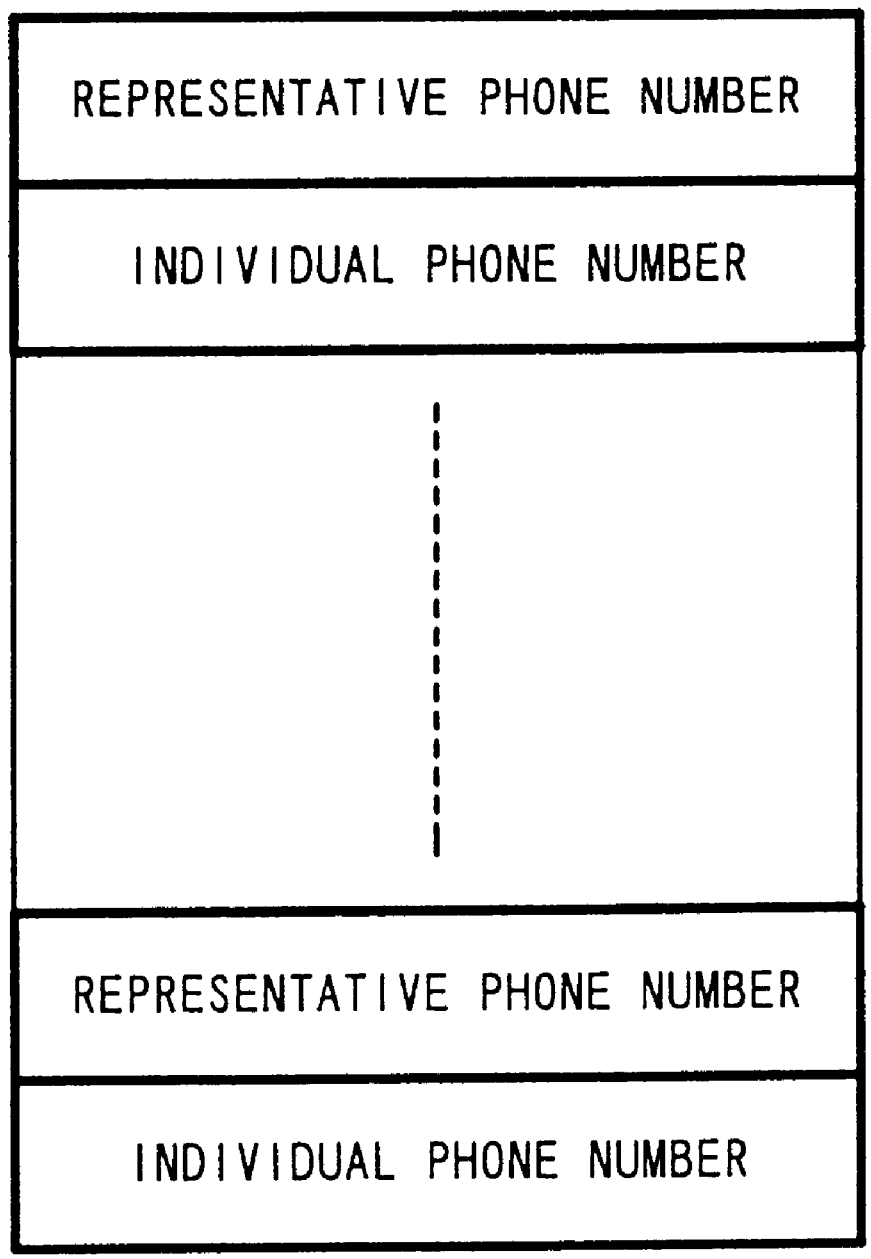
FIG. 3 is a diagram which shows a phone number data table in the first embodiment.

FIG. 2 focuses on the base station 10 and the mobile station 20 shown in FIG. 1. The base station 10 has a data processing unit 10a and a phone number data table 10b. The data processing unit 10a consists of a CPU, RAM, ROM, I/O, and other components. The notification unit 11 explained in FIG. 1 is actually implemented as a software function of this data processing unit 10a. The phone number data table 10b is a table stored in an external storage unit (not shown in FIG. 2), whose internal structure is shown in FIG. 3. This phone number data table 10b describes specific subscriber terminals that are reachable through the representative phone number connection service in the predivided zone 60 where the base station 10 resides. When such terminals are available, the phone number data table 10b stores their respective phone numbers (represented as "individual phone numbers" in FIG. 3) and their associated representative phone numbers in pairs. The data processing unit 10a reads out these representative-individual phone number pairs from the phone number data table 10b and transmits them to the subscriber terminals located in its own radio coverage area 61. Note that base stations normally sends some information to mobile terminals in the respective radio coverage areas to notify the terminals of their present locations (i.e., which radio coverage area they are visiting at present). In the present invention, the base stations are arranged so that the above representative-individual phone number pairs will be delivered to subscriber terminals, accompanying the notification of this location data.

Figure 4:
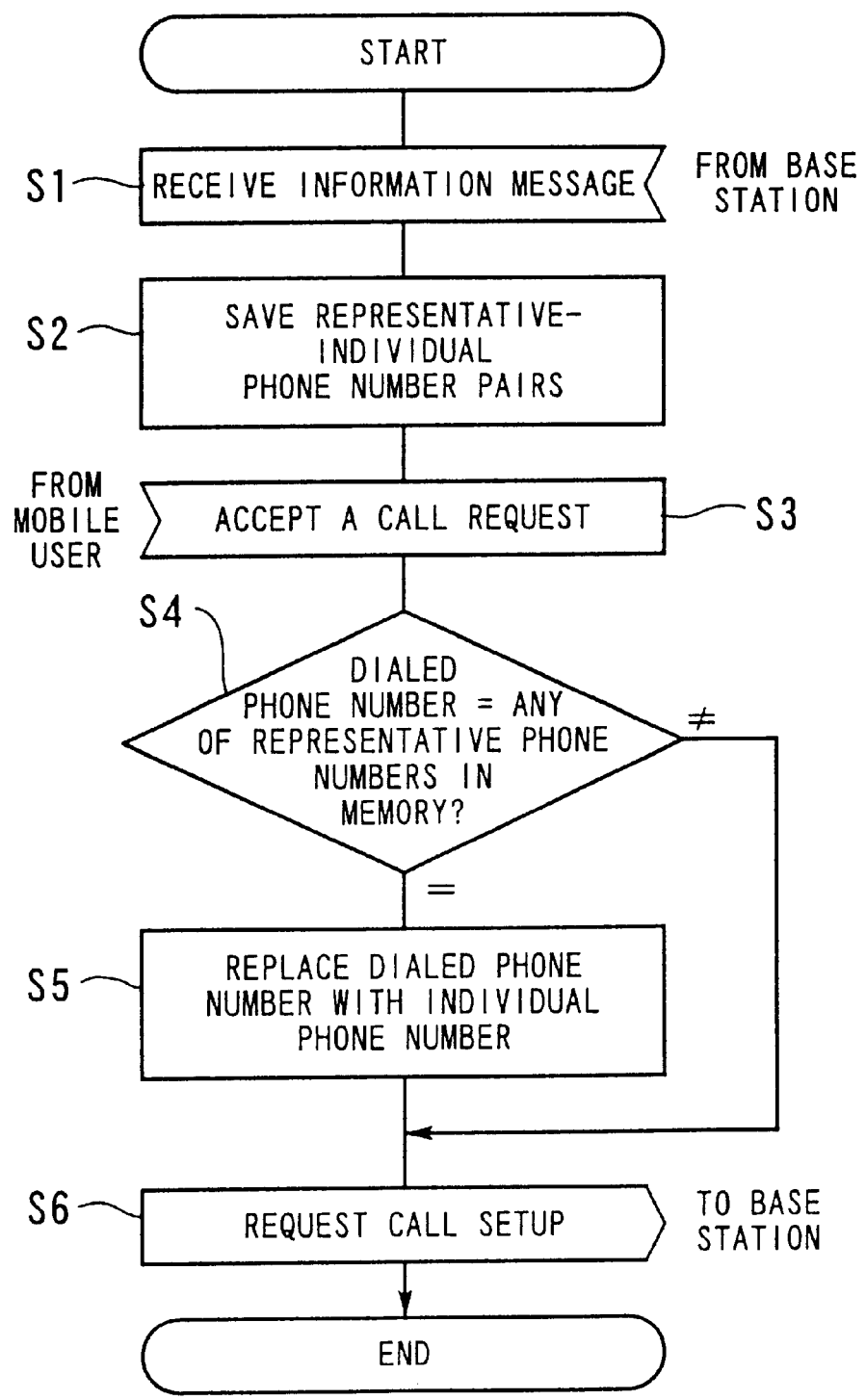
FIG. 4 is a flowchart which shows a process executed by a data processing unit of a mobile station.

The mobile station 20 comprises a data processing unit 20a, which consists of a CPU, RAM, ROM, I/O, and other components. The storage unit 21, reading unit 22, and call request unit 23 explained in FIG. 1 are actually implemented as software functions of this data processing unit 20a. Referring next to FIG. 4, the following will present how the data processing unit 20a will operate.

FIG. 4 is a flowchart which shows a process executed by the data processing unit 20a of the mobile station 20. The following explanation will follow and cite the step numbers (S1–S6) shown in FIG. 4, where appropriate.

Upon receipt of an information message from the base station 10 (step S1), the data processing unit 20a extracts representative-individual phone number pairs from the received information message and stores them into the RAM (step S2).

When the user of the mobile station 20 has dialed a phone number to initiate an outgoing call (step S3), the data processing unit 20a determines whether the phone number of this call attempt (i.e., the dialed phone number) agrees with any of the representative phone numbers stored in the RAM (step S4). If there is a match, the data processing unit 20a understands that the user is attempting to call up a subscriber terminal by using the representative phone number connection service, and that subscriber terminal does exist in the predivided zone 60 that the mobile station 20 is visiting. The data processing unit 20a then reads out the corresponding record from the RAM to retrieve an individual phone number that is paired with the dialed representative phone number. The data processing unit 20a sends a call setup request to the base station 10 (step S6), specifying the retrieved individual phone number as the call destination number (step S5). Finally, the mobile station 20 is connected to the subscriber terminal that is in the same predivided zone 60 as the mobile station 20 stays and corresponds to the dialed representative phone number. Referring back to step S4, if no matching representative phone number is found, the data processing unit 20a recognizes the dialed phone number as a normal one, and therefore, it sends a call setup request to the base station 10, specifying the given phone number as the call destination (step S6).

Now, the following section will describe a second embodiment of the present invention. While having basically the same structure as the first embodiment, the second embodiment is distinctive in the operation of the data processing units 10a and 20a and in the contents of the phone number data table 10b. Using the same element notation as in the first embodiment, the following will explain the second embodiment of the present invention.

Figure 5:
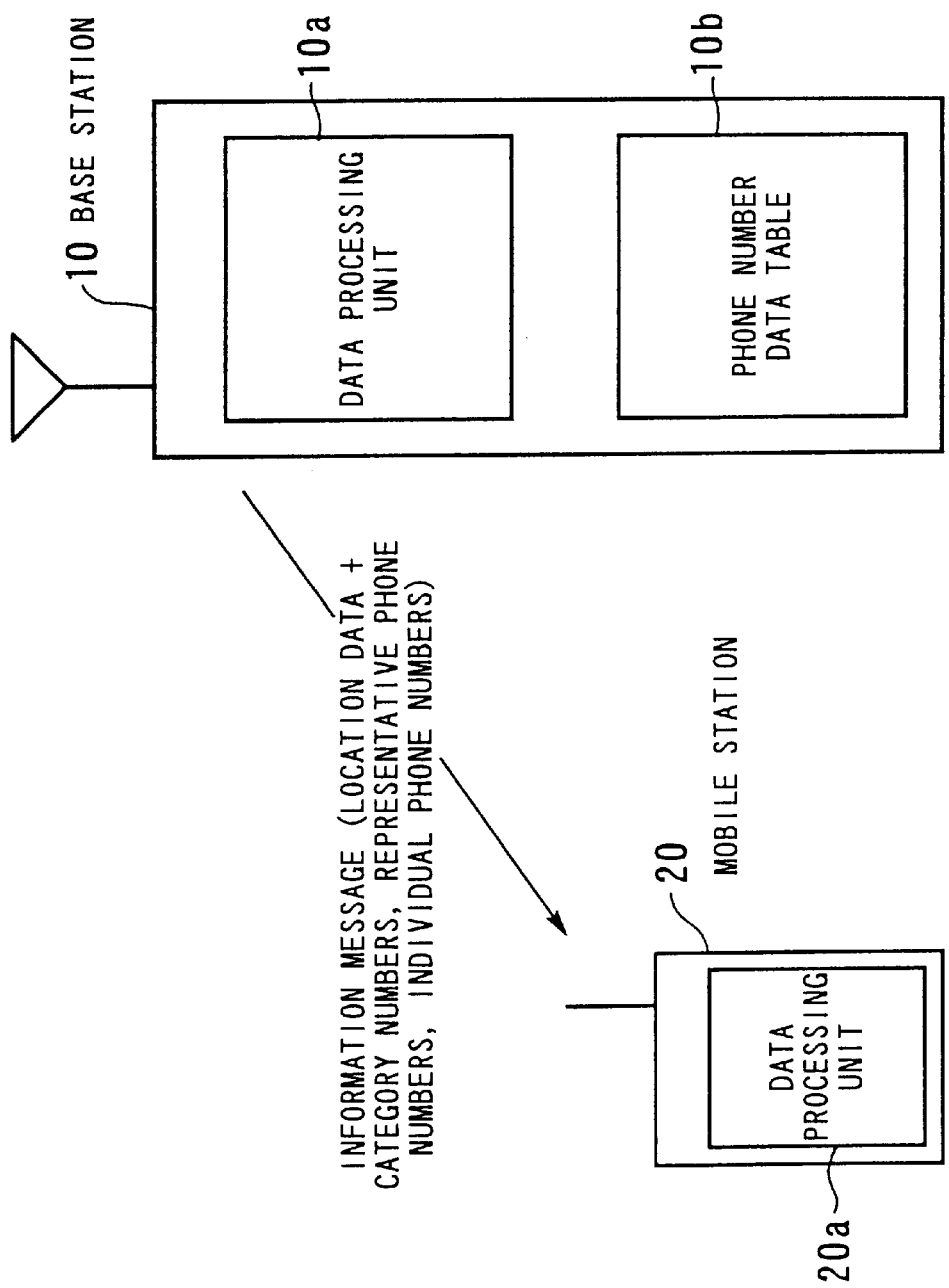
FIG. 5 is a diagram which shows a base station and a mobile station in a second embodiment of the present invention.
Figure 6:
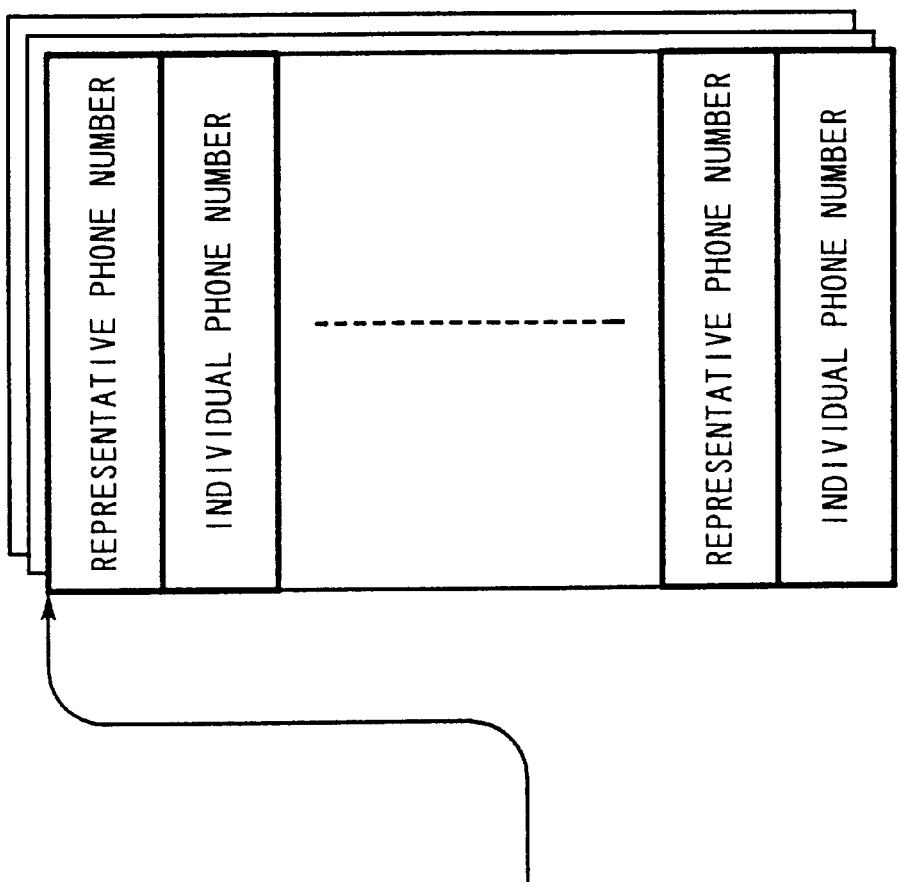
FIG. 6(A) is a diagram which shows a lookup table prepared as part of the phone number data table to associate category numbers with addresses.
FIG. 6(B) is a diagram which shows a plurality of lookup tables prepared as part of the phone number data table to associate representative phone numbers with individual phone numbers.
Figure 6:
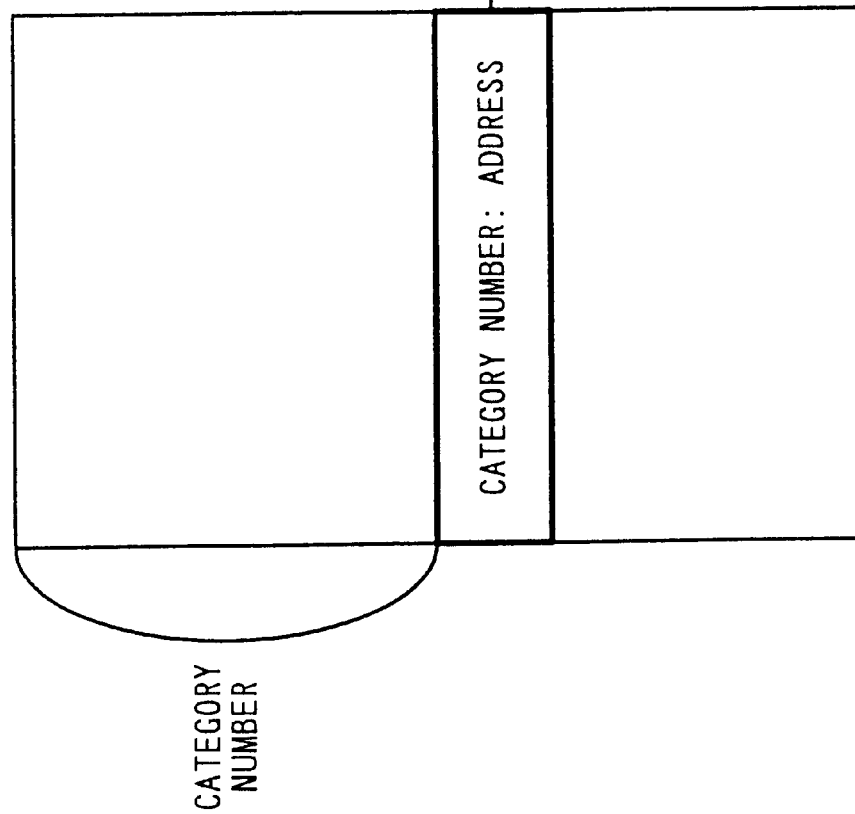

FIG. 5 illustrates the base station 10 and the mobile station 20 in the second embodiment. Here, an information message sent from the base station 10 to the mobile station 20 contains a category number. More specifically, the phone number data table 10b stored in the base station 10 is actually a collection of several tables, as depicted in FIGS. 6(A) and 6(B). The table of FIG. 6(A) is a lookup table that associates "category numbers" with "addresses". The tables of FIG. 6(B) are a plurality of lookup tables that stores representative-individual phone number pairs. The "category numbers" indicate the types of subscribers accessible through the representative phone number connection service. More specifically, subscribers are categorized into groups by industrial classification, personal preferences, or geographical areas, for example. The "address" indicates the location of an applicable portion within the phone number data table 10b, allowing a particular group of representative-individual phone number pairs to be extracted as being relevant to a given category number. That is, the representative-individual phone number pairs are sorted by category and stored into separate tables of FIG. 6(B). The locations of these tables (i.e., "addresses") are listed in the first table of FIG. 6(A), as well as being associated with the "category numbers."

Inside the base station 10, the data processing unit 10a scans the table of FIG. 6(A) to read out the category numbers. Each time one category number is obtained, the data processing unit 10a makes access to one of the representative-individual phone number tables of FIG. 6(B) by using the address corresponding to the obtained category number. Together with the category numbers, the tables retrieved as such are delivered sequentially to all mobile stations located in the base station 10's radio coverage area 61.

In the mobile station 20, for instance, the information messages received from the base station 10 are processed by the data processing unit 20a. Before presenting the details of this process, the contents of a local RAM of the data processing unit 20a will be described below.

FIGS. 7(A) and 7(B) illustrates how the RAM is allocated in the data processing unit 20a. The RAM provides a memory area shown in FIG. 7(A) for storing a category number and another area shown in FIG. 7(B) for storing representative-individual phone number pairs.

Figure 8:
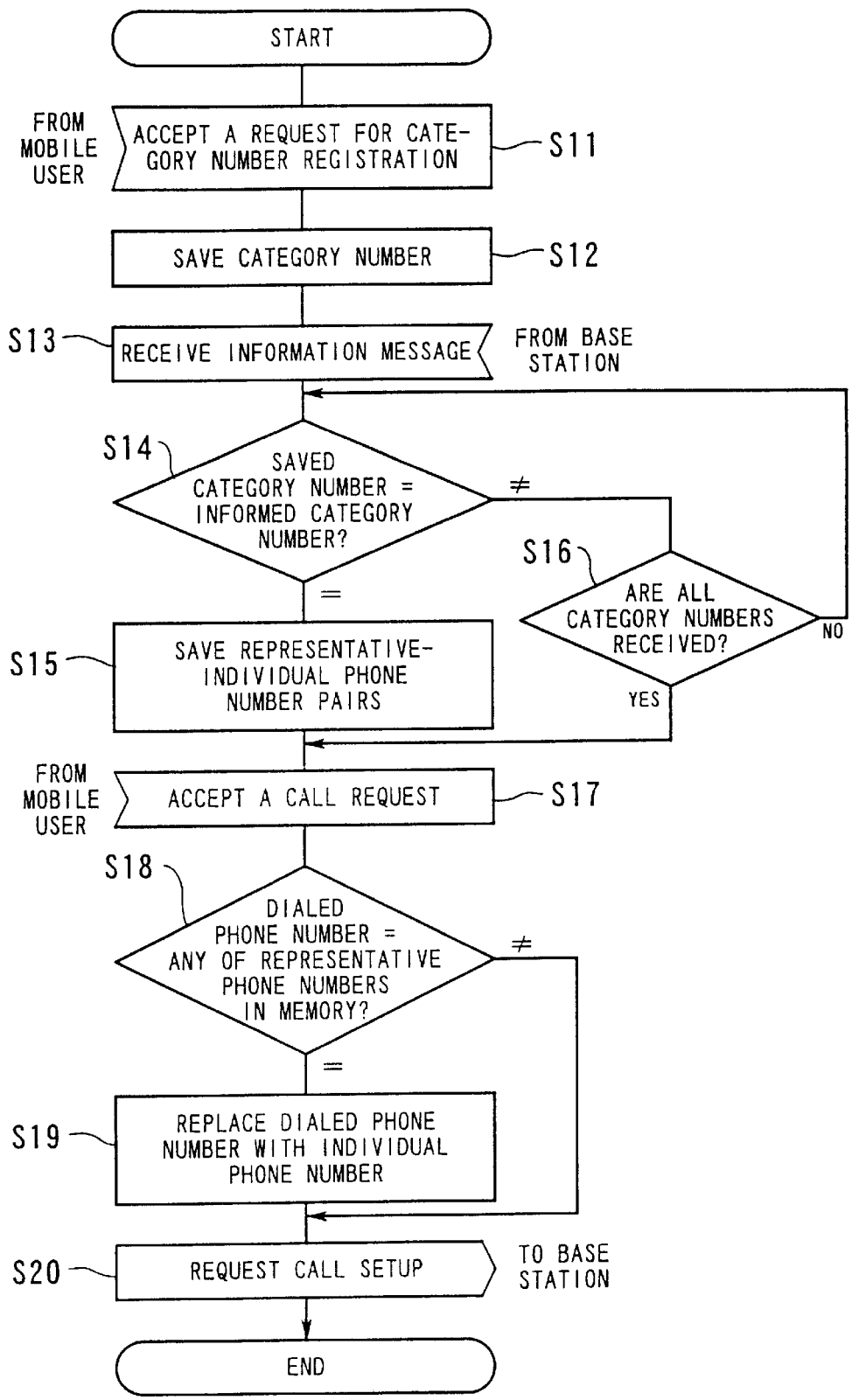
FIG. 8 is a flowchart which shows a process executed by a data processing unit of a mobile station in the second embodiment of the present invention.

FIG. 8 is a flowchart describing a process executed by the data processing unit 20a of the mobile station 20 in the second embodiment of the present invention. The following explanation will follow and cite the step numbers (S11–S20) shown in FIG. 8, where appropriate.

The user of the mobile station 20 first chooses a specific category of representative phone number connection services which he/she may use, and then sets up his/her mobile station 20 by entering the desired category number (step S11). The data processing unit 20a integrated in the mobile station 20 saves this category number into the RAM as shown in FIG. 7(A) (step S12).

The mobile station 20 receives information messages from the base station 10 (step S13). The information messages contain a plurality of category numbers and their respective lookup tables, in addition to the location data mentioned in earlier sections. The data processing unit 20a compares the category number registered in its local RAM with those contained in the information messages (step S14). If a match is found, the data processing unit 20a extracts a relevant representative-individual lookup table from the information message and stores it into the aforementioned RAM area of FIG. 7(B) (step S15). If no match is found, the data processing unit 20a repeats the step S14 until it finishes the comparison for all category numbers available in the received messages (step S16). The remaining steps S17 to S20 are the same as the steps S3 to S6, respectively, of FIG. 4 explained in the first embodiment.

As explained above, the second embodiment of the present invention has introduced the concept of category numbers.

This arrangement frees mobile stations from the need for keeping all possible representative-individual phone number pairs, thus allowing the data processing units to save their local RAM space.

The following section will now describe a third embodiment of the present invention. While having basically the same structure as the first embodiment, the third embodiment is distinctive in the operation of the data processing unit 10a and in the contents of the phone number data table 10b. Using the same element notation as in the first embodiment, the following will explain the second embodiment of the present invention.

Figure 9:
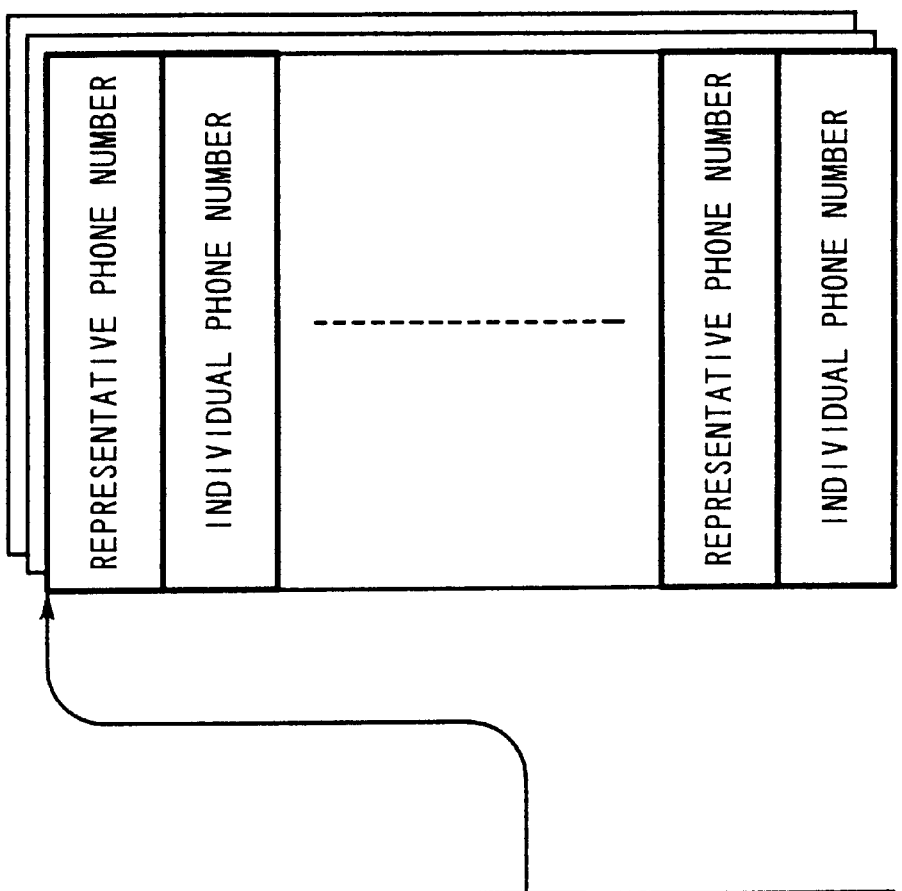
FIG. 9(A) is a diagram which shows a lookup table prepared as part of the phone number data table in a third embodiment of the present invention to associate time slots with addresses.
FIG. 9(B) is a diagram which shows a plurality of lookup tables prepared as part of the phone number data table in the third embodiment to associate representative phone numbers with individual phone numbers.
Figure 9:
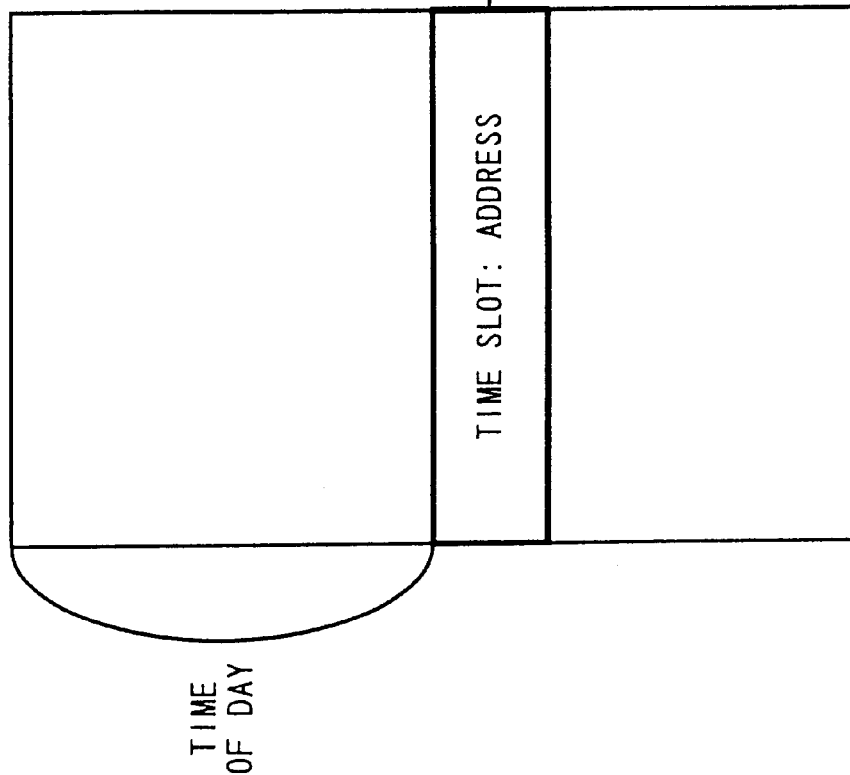

FIG. 9 shows the configuration of a phone number data table 10b stored in a base station 10 according to the third embodiment. More specifically, the phone number data table 10b actually consists of two kinds of tables; the first table of FIG. 9(A) is a lookup table that associates "time slots" with "addresses," while the second tables of FIG. 9(B) are a plurality of lookup tables storing representative-individual phone number pairs.

Although the first and second embodiments assume that all subscriber terminals are in service from morning till night, the expense for representative phone number connection services, including labor costs, will be reduced if, for example, the number of available subscriber terminals is limited in the nighttime. The third embodiment of the present invention caters to such a demand by permitting different representative-individual phone number pairs to be defined for different time slots in a day.

More specifically, separate tables of representative-individual phone number pairs are prepared for different time slots and saved as part of the phone number data tables 10b, as shown in FIG. 9(B). The index of these tables is formulated as shown in FIG. 9(A), where the time slots and corresponding table locations, or "addresses," are stored in pairs.

The data processing unit 10a in the base station searches the table of FIG. 9(A) for a specific time slot that includes the present time of day, thereby yielding an address associated with the time slot found. With this address information, the data processing unit 10a then retrieves a table of representative-individual phone number pairs and sends it to the mobile station 20. The data processing unit 20a in the mobile station 20 will execute the rest of the process just as in the first embodiment.

In this way, the system of the third embodiment can connect a caller to different subscriber terminals in an adaptive manner, depending on the present time of day. This time-adaptive connection service can also be interpreted as varying the size of the predivided zones 60 and 70 (FIG. 1) according to the time of day.

The following section will now describe a fourth embodiment of the present invention. While having basically the same structure as the first embodiment, the fourth embodiment is distinctive in the operation of the data processing units 10a and 20a (FIG. 2), as well as in the contents of the phone number data table 10b. Using the same notation as in the first embodiment, the following will explain the fourth embodiment of the present invention.

Figure 10:
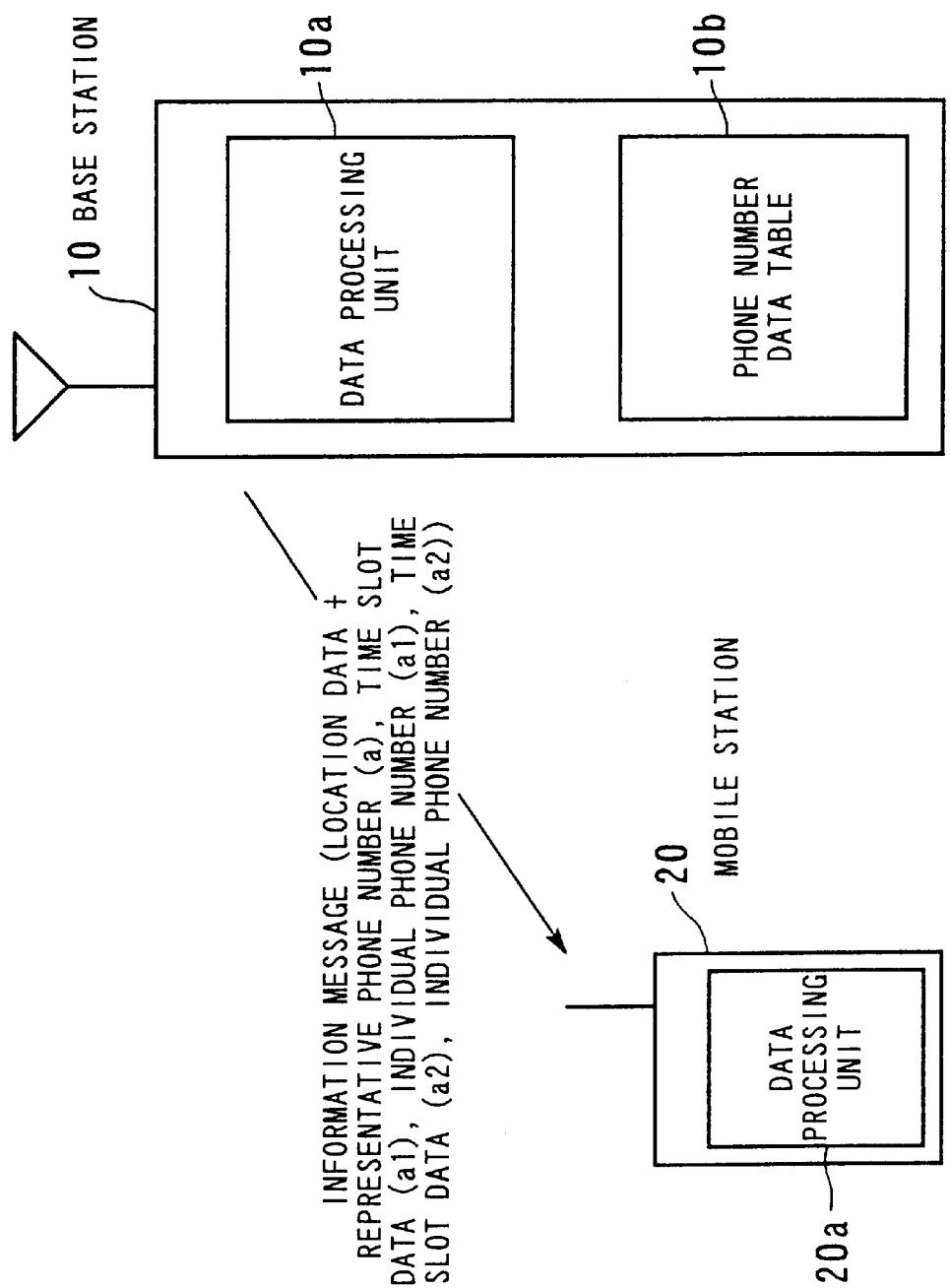
FIG. 10 is a diagram which shows a base station and a mobile station in a fourth embodiment of the present invention.
Figure 11:
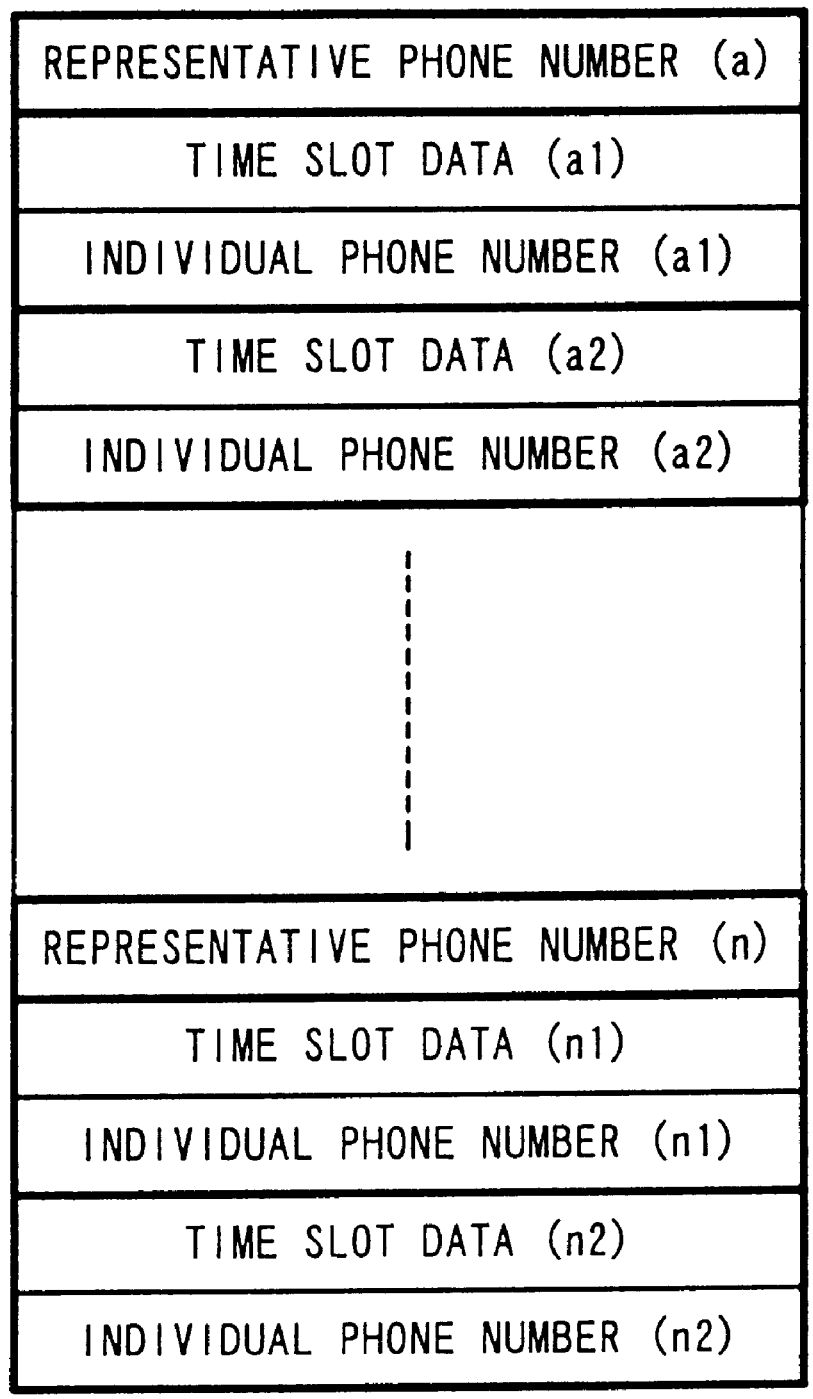
FIG. 11 is a diagram which shows a phone number data table in the fourth embodiment.

FIG. 10 illustrates a base station 10 and a mobile station 20 according to the fourth embodiment. Here, an a information message sent from the base station 10 to the mobile station 20 contains time slot information. More specifically, the phone number data table 10b stored in the base station 10 actually contains a plurality of entries for each single representative phone number, as depicted in FIG. 11, each entry consisting of time slot information and call destination number information.

Similar to the third embodiment, the fourth embodiment caters to the demands for labor cost reduction by permitting different individual phone numbers to be linked to a representative phone number, depending on the time slots in a day. This makes it possible to allocate, for example, fewer subscriber terminals to the service in the nighttime than in the daytime. To this end, the fourth embodiment formulates the phone number data table 10b so that each single representative phone number will be accompanied by a plurality of individual phone numbers each associated with a different time slot. The data processing unit 10a reads such entries out of the phone number data table 10b and transmits them to mobile stations located in the radio coverage area 61.

On receiving this lookup table, the data processing unit 20a in the mobile station 20 saves the table into its local RAM. When a call request is received along with a specific representative phone number, the data processing unit 20a scans the table in the RAM to find a table entry having the specified representative phone number. The data processing unit 20a then obtains a plurality of individual phone numbers corresponding to the representative phone number found. It now chooses one out of such phone numbers whose time slot information matches the present time of day. The individual phone number determined as such is then sent to the base station 10 as part of a call setup request. Finally, the mobile station 20 is connected to the subscriber terminal that has been associated with the given representative phone number and is valid at the present time. When compared with the third embodiment, this configuration of the fourth embodiment alleviates the workloads imposed on the base stations.

The above discussion is summarized as follows. According to the present invention, a notification unit disposed in a base station notifies mobile stations in its local radio coverage area, of representative phone numbers and individual phone numbers of subscriber terminals that are located in the same predivided zone as the base station resides and are associated with the representative phone numbers. Upon receipt of this information, a storage unit disposed in each mobile station stores the representative phone numbers and their associated individual phone numbers. When a mobile user has dialed a representative phone number to initiate a call from his/her mobile station, a reading unit disposed in the mobile station searches the storage unit to read out a specific individual phone number associated with the dialed representative phone number. A call request unit then sends a call setup request to the base station, specifying the individual phone number read out by the reading unit as the call destination number. This enables the mobile station to be connected to the subscriber terminal that is registered in the representative phone number connection service.

As clarified above, the present invention can reduce the system's equipment costs, since it eliminates the conventional database. In addition, the present invention frees the mobile services switching centers from the burden of determining whether each call refers to a representative phone number, or of generating a query to the database as to the call destination numbers. This contributes to the improvement of mobile communications systems in terms of the throughput and reliability.

Furthermore, the present invention allows the service coverage area to be divided into smaller segments, in order for more subscriber terminals to share a common representative phone number. This introduces more flexibility in the representative phone number connection services.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A call destination number conversion system for use in a mobile communications system to provide a representative phone number connection service which permits a user of a mobile station to reach, by simply dialing a representative phone number, a specific subscriber terminal located within a predivided zone where the mobile station stays, the representative phone number being previously assigned to the plurality of subscriber terminals each having an individual phone number, in such a way that the representative phone number will be uniquely associated with one individual phone number within each predivided zone, the call destination number conversion system comprising:

notification means, disposed in a base station, for notifying the mobile station of the representative phone number and the individual phone number of a subscriber terminal that is associated with the representative phone number and is located in the same predivided zone as the base station resides;

storage means, disposed in the mobile station, for storing the representative and individual phone numbers notified from said notification means;

reading means, disposed in the mobile station, for searching said storage means upon receipt of the representative phone number that the mobile user has dialed in an attempt to initiate a call from the mobile station, and reading out the individual phone number that is associated with the representative phone number; and call requesting means, disposed in the mobile station, for sending a call setup request to the base station, specifying as a call destination number the individual phone number read out by said reading means.

2. The call destination number conversion system according to claim 1, wherein said notification means notifies the mobile station of location data indicative of a radio coverage area that the mobile station is visiting, and delivers the representative and individual phone numbers to the mobile station as additional data attached to the location data.

3. The call destination number conversion system according to claim 1, wherein the predivided zones are mapped onto individual radio coverage zones.

4. The call destination number conversion system according to claim 1, wherein the predivided zones each contain a plurality of radio coverage zones.

5. The call destination number conversion system according to claim 1, further comprising:

additional notification means for notifying the mobile station of a category number that indicates a category of the subscriber terminals corresponding to the representative phone number, in addition to the representative phone number and the individual phone number;

category number storage means, disposed in the mobile station, for storing a preferred category number entered by the user of the mobile station; and storage control means, disposed in the mobile station, for comparing the category number received from said additional notification means with the preferred category number stored in said category number storage means, and only when the two category numbers match with each other, allowing said storage means to store the received representative phone number and individual phone number.

6. The call destination number conversion system according to claim 1, further comprising time-based storage means, disposed in the base station, for storing the representative and individual phone numbers in association with the time of day, wherein said notification means searches said time-based storage means to notifies the mobile station of the representative and individual phone numbers that is appropriate for the present time of day.

7. The call destination number conversion system according to claim 1, wherein said notification means notifies the mobile station of the representative phone number and a plurality of individual phone numbers associated with different time slots, said storage means stores the representative phone number and the plurality of individual phone numbers associated with different time slots, and said reading means searches said storage means to read out one of the individual phone numbers that is associated with the representative phone number entered by the user and is appropriate for the present time of day.

8. A mobile station for use in a mobile communications system to provide a representative phone number connection service, comprising:

storage means, disposed in the mobile station, for storing the representative and individual phone numbers notified from a base station, the individual phone number being associated with the representative phone number and being located in the same pre-divided zone as the base station resides;

reading means for searching said storage means upon receipt of the representative phone number that the mobile user has dialed in an attempt to initiate a call from the mobile station, and reading out the individual phone number that is associated with the representative phone number; and call requesting means for sending a call setup request to the base station, specifying as a call destination number the individual phone number read out by said reading means.

* * * * *